United States Patent [19]
Bird et al.

[11] 3,773,552
[45] Nov. 20, 1973

[54] PROCESS OF PROVIDING UNIFORM GLOSS, LACQUER COATED ALKENYL AROMATIC RESIN ARTICLE

[75] Inventors: Arnett L. Bird; Ronald G. Lehrer; John E. Mullen, all of Midland, Mich.

[73] Assignee: The Dow Chemical Company, Midland, Mich.

[22] Filed: Nov. 17, 1971

[21] Appl. No.: 199,741

[52] U.S. Cl. 117/138.8 UA, 117/138.8 E, 260/876 B, 260/876 R, 260/897 C
[51] Int. Cl. B32b 27/06, B44d 5/00
[58] Field of Search 117/138.8 E, 138.8 UA; 260/897 C, 889, 876 B, 876 R

[56] References Cited
UNITED STATES PATENTS

| | | | |
|---|---|---|---|
| 2,510,851 | 6/1950 | Bacon et al. | 117/138.8 X |
| 3,494,982 | 2/1970 | Grabowski et al. | 260/897 X |
| 3,578,484 | 5/1971 | Walles et al. | 117/47 |

FOREIGN PATENTS OR APPLICATIONS

827,543  2/1960  Great Britain

*Primary Examiner*—William D. Martin
*Assistant Examiner*—Sadie L. Childs
*Attorney*—William M. Yates et al.

[57] ABSTRACT

Process of preparing articles from thermoplastic alkenyl aromatic resins having uniform gloss and chemical resistance by applying a lacquer coating to a substrate prepared from a blend consisting essentially of (1) from about 85 to 98 percent by weight of a thermoplastic alkenyl aromatic resin, and (2) from about 2 to 15 percent by weight of an essentially li near macromolecular olefin polymer containing from about 25 to about 50 percent by weight of chemically combined chlorine.

5 Claims, No Drawings

PROCESS OF PROVIDING UNIFORM GLOSS, LACQUER COATED ALKENYL AROMATIC RESIN ARTICLE

BACKGROUND OF THE INVENTION

Blends of thermoplastic alkenyl aromatic resins with chlorinated olefin polymers are known, e.g., as described in U.S. Pat. No. 3,494,982, issued Feb. 10, 1970, which disclosed blends of ABS polymers with chlorinated polyethylene; British Pat. No. 827,543 published Feb. 10, 1960, which discloses blends of polystyrene with chlorinated polyethylene; and Japanese Pat. No. 13,255, issued in 1967, which disclosed blends of styrene-acrylonitrile copolymers with chlorinated polyethylene.

Heretofore, however, these prior known polymer blends have not been used to prepare lacquer coated shaped articles. Such articles have been prepared from the herein defined alkenyl aromatic resins but have been undesirably characterized by surface etching upon application of the lacquer coating with resulting loss of surface gloss. This effect is believed to be due to a stress relaxation, or deorientation of the polymer surface due to the action of the lacquer coating. It is the primary object of the present invention to provide uniform gloss lacquer coated articles prepared from alkenyl aromatic resins, i.e., articles wherein the alkenyl aromatic resin substrate is resistant to etching resulting from the application of conventional lacquer coatings.

SUMMARY

The above and related objects are accomplished by utilization of a substrate material consisting essentially of (1) from about 85 to 98 percent by weight of a thermoplastic alkenyl aromatic resin; and (2) from about 2 to 15 percent by weight of an essentially linear macromolecular chlorinated olefin polymer containing from about 25 to about 50 percent by weight of chemically combined chlorine.

DESCRIPTION OF THE PREFEFFED EMBODIMENTS

By an alkenyl aromatic resin is meant a solid polymer of one or more polymerizable alkenyl aromatic compounds wherein the polymer, copolymer or interpolymer comprises, in chemically combined form, at least about 40 percent by weight of at least one alkenyl aromatic compound having the general formula

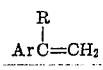

wherein Ar represents an aromatic hydrocarbon radical, or an aromatic holohydrocarbon radical of the benzene series containing up to 12 carbon atoms, and R is hydrogen or the methyl radical; and where any remainder comprises one or more olefinically unsaturated monomer copolymerized therewith.

Examples of such alkenyl aromatic monomers are styrene, α-methylstyrene, o-methylstyrene, m-methylstyrene, p-methylstyrene, ar-ethylstyrene, ar-vinylxylene, ar-chlorostyrene, or ar-bromostyrene, tert-.butylstyrene and the like, which may have dissolved or dispersed therein rubbers such as polybutadiene rubber, either of the stereospecific or nonstereospecific variety, block copolymers of styrene and butadiene and like rubbers or polymeric materials employed for increasing the impact resistance of styrene polymers. Particularly preferred materials include the ABS-type polymers, such as disclosed in U.S. Pat. No. 2,694,692, issued Nov. 16, 1954, and U.S. Pat. No. 3,555,119, issued Jan. 12, 1971; the copolymers of styrene and acrylonitrile, preferably those copolymers containing from about 65 to 80 percent styrene and from about 35 to 20 percent acrylonitrile as disclosed by U.S. Pat. No. 2,739,142, issued Mar. 20, 1956; and polystyrene, the preparation of which is well known in the art.

The olefin polymers which are particularly adapted for chlorination and subsequent use in the present invention are those distinct species and varieties of essentially linear and unbranched highly porous polymers containing at least about 90 mole percent ethylene in the polymer molecule with the remainder being one or more ethylenically unsaturated comonomers, such polymers being prepared under the influence of catalyst systems comprising admixtures of strong reducing agents such as triethyl aluminum and compounds of Groups IV-B, V-B and VI-B metals of the Periodic System, such as titanium tetrachloride, and the like, and having a molecular weight less than about 1,000,000 and preferably between about 20,000 and 30,000.

The polyolefins are readily chlorinated by practice of a chlorination procedure which comprehends the suspension chlorination in an inert medium of the described polyolefins, while in finely divided form, to a desired total of combined chlorine content, wherein such polymer is first chlorinated at a temperature below its agglomeration temperature for a period sufficient to provide a chlorine content of from about 2 to 23 percent chlorine, based on the total weight of the polymer; followed by the sequential suspension chlorination of such polymer for a period sufficient to provide a total chlorine content of from about 25 to 50 percent. Preferred process for preparing such chlorinated polyolefins are disclosed in U.S. Pat. No. 3,454,544, issued July 8, 1969.

The alkenyl aromatic resin and chlorinated olefin polymer can be admixed using any conventional technique including mechanical admixing in powder or molten form. A preferred method for preparing such polymer blends is the preparation of a concentrate of such materials containing from about 10 to 35 percent by weight of alkenyl aromatic resin and from about 90 to 65 percent by weight of chlorinated olefin polymer, followed by admixing such concentrate with additional amounts of alkenyl aromatic resin, e.g., by tumble blending, and subsequently forming injection molded plaques for subsequent application of the lacquer coating. It is to be understood that additional formulation additives can be used if desired, e.g., stabilizers and the like such as small amounts of stearic acid and pigments such as carbon black.

The lacquers which are subsequently coated on the alkenyl aromatic resin-chlorinated olefin polymer substrate may be any conventionally employed material including the nitrocellulose and acrylic type lacquers.

The articles of the present invention find particular use as uniform, high gloss, painted ladies' shoe heels, and uniform gloss painted automotive instrument cluster housing and other automotive plastic parts; as packaging materials for food containing fats and oils; refrigerator inner liners for improved chemical resistance to fats, oils and Freon gas, such as used as a blowing agent in polyurethane foam; and as molded articles such as pipe and pipe fittings.

The invention is further illustrated but not limited by the following examples:

Example 1

In each of a series of experiments individual plaques measuring 4 inches in width by 11 inches in length and having a thickness of about 0.100 of an inch were prepared by injection molding one of several blends of (1) an alkenyl aromatic resin (as hereinafter specifically described), and (2) a chlorinated polyethylene (CPE) having a chlorine content of about 25 percent by weight, an ultimate tensile strength of about 1500 psi, a 100 percent modulus of about 500 psi, and an elongation of about 900 percent. Each plaque was then individually coated with one of a series of clear lacquers and the surface gloss of each coated surface determined using a Hunterlab Model D36 Distinctness of Image Glossmeter. This glossmeter provides a numerical value for what the eye sees with the peak readings being a measure of shininess and the slope reading a measure of reflectance. The most shiny, glossy and reflective plaques have the highest values. The following Table I sets forth the polymer blends and lacquers used along with the peak and slope values described above.

The alkenyl aromatic resins and lacquers used are as follows:

Alkenyl Aromatic Resins (1) an ABS resin containing about 25 percent by weight acrylonitrile, about 9 percent by weight of a block copolymer of about 30 percent by weight styrene and about 70 percent by weight butadiene, such ABS resin having a melt viscosity $\eta^7$ poise of about 18,000;

(2) a polystyrene having a melt viscosity $\eta^7$ poise of about 5,200; and (3) A copolymer of about 75 percent by weight styrene and 25 percent by weight acrylonitrile having a melt viscosity $\eta^7$ poise of about 15,000.

Lacquers (A) Wurdack lacquer 4391-N, (B) Red Spot 300, Series SL 9440 black ABS lacquer with 25 percent SL 3316 thinner, (C) Acetone, and (D) Methyl ethyl ketone.

TABLE I

| Exp. number | Alkenyl aromatic resin | | CPE amount (percent) | Lacquer type | Coated surface gloss values | |
|---|---|---|---|---|---|---|
| | Type | Amount (percent) | | | Peak | Slope |
| Series I: | | | | | | |
| 1 | (1) | 100 | 0 | (A) | 1.5 | 0 |
| 2 | (1) | 97.5 | 2.5 | (A) | 16.4 | 15.3 |
| 3 | (1) | 95.0 | 5.0 | (A) | 29.0 | 21.6 |
| 4 | (1) | 92.5 | 7.5 | (A) | 44.0 | 31.8 |
| 5 | (1) | 90.0 | 10.0 | (A) | 51.4 | 36.0 |
| Series II: | | | | | | |
| 6 | (1) | 100 | 0 | (B) | 1.6 | 0 |
| 7 | (1) | 97.5 | 2.5 | (B) | 19.8 | 16.5 |
| 8 | (1) | 95.0 | 5.0 | (B) | 31.4 | 21.8 |
| 9 | (1) | 92.5 | 7.5 | (B) | 58.6 | 38.9 |
| 10 | (1) | 90.0 | 10.0 | (B) | 66.4 | 44.3 |
| Series III: | | | | | | |
| 11 | (1) | 100 | 0 | (C) | 11.8 | 9.8 |
| 12 | (1) | 97.5 | 2.5 | (C) | 70.3 | 38.1 |
| 13 | (1) | 95.0 | 5.0 | (C) | 98.4 | 54.4 |
| 14 | (1) | 92.5 | 7.5 | (C) | >100.0 | 69.8 |
| 15 | (1) | 90.0 | 10.0 | (C) | >100.0 | 72.7 |
| Series IV: | | | | | | |
| 16 | (1) | 100 | 0 | (D) | 19.2 | 15.3 |
| 17 | (1) | 97.5 | 2.5 | (D) | 69.7 | 39.7 |
| 18 | (1) | 95.0 | 5.0 | (D) | 93.4 | 54.1 |
| 19 | (1) | 92.5 | 7.5 | (D) | >100.0 | 71.6 |
| 20 | (1) | 90.0 | 10.0 | (D) | >100.0 | 72.3 |
| Series V: | | | | | | |
| 21 | (2) | 100 | 0 | (A) | 1.2 | 0 |
| 22 | (2) | 95 | 5 | (A) | 17.6 | 14.9 |
| 23 | (2) | 90 | 10 | (A) | 31.7 | 22.8 |
| Series VI: | | | | | | |
| 24 | (2) | 100 | 0 | (B) | 1.2 | 0 |
| 25 | (2) | 95 | 5 | (B) | 24.7 | 20.5 |
| 26 | (2) | 90 | 10 | (B) | 42.7 | 29.4 |
| Series VII: | | | | | | |
| 27 | (2) | 100 | 0 | (C) | 1.1 | 0 |
| 28 | (2) | 95 | 5 | (C) | 1.2 | 0 |
| 29 | (2) | 90 | 10 | (C) | 2.0 | 0 |
| Series VIII: | | | | | | |
| 30 | (2) | 100 | 0 | (D) | 8.1 | 13.7 |
| 31 | (2) | 95 | 5 | (D) | 12.4 | 15.1 |
| 32 | (2) | 90 | 10 | (D) | 12.6 | 16.5 |
| Series IX: | | | | | | |
| 33 | (3) | 100 | 0 | (A) | 1.0 | 0 |
| 34 | (3) | 95 | 5 | (A) | 9.3 | 8.7 |
| 35 | (3) | 90 | 10 | (A) | 27.1 | 20.2 |
| Series X: | | | | | | |
| 36 | (3) | 100 | 0 | (B) | 0.7 | 0 |
| 37 | (3) | 95 | 5 | (B) | 14.8 | 11.7 |
| 38 | (3) | 90 | 10 | (B) | 36.1 | 23.9 |
| Series XI: | | | | | | |
| 39 | (3) | 100 | 0 | (C) | 10.0 | 2.5 |
| 40 | (3) | 95 | 5 | (C) | 90.5 | 52.7 |
| 41 | (3) | 90 | 10 | (C) | >100.0 | 74.4 |
| Series XII: | | | | | | |
| 42 | (3) | 100 | 0 | (D) | 20.1 | 11.4 |
| 43 | (3) | 95 | 5 | (D) | 94.1 | 55.2 |
| 44 | (3) | 90 | 10 | (D) | >100.0 | 70.9 |

The data from Table I illustrate the enhanced gloss provided by use of a substrate containing the designated alkenyl aromatic resin in conbination with the chlorinated polyethylene. Further, the coated samples wherein the chlorinated polyethylene was not used exhibited evidence of nonuniform relaxing of the surface, i.e., as small bumbs along the surface. By way of comparison, the articles desicrbed by the present invention were free from such defect and were characterized by an extremely uniform gloss. Similar good results as set forth herein were found utilizing chlorinated polyethylenes of the type described in Example I but containing 36 and 48 percent by weight of chemically combined chlorine. Further, substantially equivalent good results were obtained when utilizing preformed concentrates composed of from 25 to 35 percent by weight of the described ABS polymer with from 75 to 65 percent by weight of the described chlorinated polyethylene, wherein such concentrates were blended with additional amounts of such ABS resin to provide blends containing 90 and 95 percent by weight of ABS.

Example 2

In each of a series of additional experiments, individual test bars were prepared by injection molding one of several of the blends as set forth in Example 1. A surface of each test bar was then smeared with a mixture of 50 percent conttonseed oil and 50 percent oleic acid. Each test bar was then stressed at deflections of 1,500, 3,000 and 4,500 microinches for 24 hours. The ultimate elongation was then determined for each product and compared to the original elongation. This test is commonly used by the refrigeration industry to screen potential plastics for use as inner doors and food liners. The following Table II sets forth the compositions used and the testing results obtained;

TABLE 11

| Exp. number | Alkenyl aromatic resin | | CPE amount (percent) | Ultimate elongation after stress | | | |
|---|---|---|---|---|---|---|---|
| | Type | Amount (percent) | | Original | 1,500 | 3,000 | 4,500 |
| 45 | (1) | 95 | 5 | 8.7 | 7.6 | 8.0 | 11.0 |
| 46 | (1) | 90 | 10 | 16.3 | 11.5 | 9.1 | 10.5 |

The data from Table II illustrates that the articles of the present invention are substantially uneffected by the exposure to the cottonseed oil – oleic acid mixture.

What is claimed is:

1. In the process of preparing articles from thermoplastic alkenyl aromatic resins said articles having a uniform gloss lacquer coating thereon the improvement consisting of applying a lacquer coating to a substrate consisting essentially of a blend of (1) from about 85 to 98 percent by weight of said thermoplastic alkenyl aromatic resin, and (2) from about 2 to 15 percent by weight of an essentially linear macromolecular olefin polymer containing from about 25 to about 50 percent by weight of chemically combined chlorine.

2. The process of claim 1 wherein said thermoplastic alkenyl aromatic resin is, in chemically combined form, at least about 40 percent by weight of at least one alkenyl aromatic compound having the general formula:

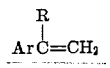

wherein Ar represents an aromatic hydrocarbon radical or an aromatic halohydrocarbon radical of the benzene series containing up to 12 carbon atoms and R is hydrogen or the methyl radical, with the remainder being one or more olefinically unsaturated monomer copolymerized therewith.

3. The process of claim 2 wherein said thermoplastic alkenyl aromatic resin is selected from the group consisting of: polystyrene, a copolymer of styrene and acrylonitrile, and an acrylonitrile- butadiene-styrene polymer.

4. The process of claim 1 wherein the chlorinated olefin polymer is chlorinated polyethylene.

5. The process of claim 4 wherein the chlorinated polyethylene has a molecular weight of from about 20,000 and 300,000 and has a crystallinity of less than about 10 percent when containing about 34 or more weight percent of chlorine.

* * * * *